United States Patent
Zhang et al.

(10) Patent No.: US 11,582,698 B2
(45) Date of Patent: Feb. 14, 2023

(54) POWER CONTROL METHOD AND DEVICE, TERMINAL, AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Yi Zhang, Beijing (CN); Xueying Hou, Beijing (CN); Liang Xia, Beijing (CN); Lijie Hu, Beijing (CN)

(73) Assignees: CHINA MOBILE COMMUNICATION CO., LTD RESEARCH INST, Beijing (CN); CHINA MOBILE COMMUNICTION GROUP CO., LTD., Beijing (CN)

( * ) Notice: Subject to any disclaimer, the term of this patent is extended or adjusted under 35 U.S.C. 154(b) by 111 days.

(21) Appl. No.: 17/263,484

(22) PCT Filed: Jul. 30, 2019

(86) PCT No.: PCT/CN2019/098471
§ 371 (c)(1),
(2) Date: Jan. 26, 2021

(87) PCT Pub. No.: WO2020/024954
PCT Pub. Date: Feb. 6, 2020

(65) Prior Publication Data
US 2021/0204220 A1    Jul. 1, 2021

(30) Foreign Application Priority Data
Jul. 30, 2018   (CN) .................. 201810854475.5

(51) Int. Cl.
H04W 52/34    (2009.01)
H04W 52/08    (2009.01)
(Continued)

(52) U.S. Cl.
CPC ......... H04W 52/08 (2013.01); H04W 52/146 (2013.01); H04W 76/11 (2018.02)

(58) Field of Classification Search
CPC ..... H04W 52/08; H04W 52/32; H04W 52/34; H04W 52/06; H04W 52/10; H04W 52/38
See application file for complete search history.

(56) References Cited

U.S. PATENT DOCUMENTS 9,392,550 B2    7/2016  Lee et al.
2016/0014834 A1    1/2016  Chang et al.
(Continued)

FOREIGN PATENT DOCUMENTS

CN    102612129 A    7/2012
CN    103037489 A    4/2013
(Continued)

OTHER PUBLICATIONS

"Remaining Issues of UL Power Control", Apr. 2018, 3GPP TSG RAN WG1 RAN1 Meeting #92-Bis R1-1804069, Sanyo, China, Source: MediaTek Inc., Document for: Discussion and Decision, 6 pgs.
(Continued)

*Primary Examiner* — Tu X Nguyen
(74) *Attorney, Agent, or Firm* — Cooper Legal Group, LLC (57) ABSTRACT

Disclosed are a power control method and device, a terminal, and a storage medium. The method comprises: determining a reference point corresponding to the closed-loop power control parameter of a PUSCH transmission unit i; determining a power adjustment amount corresponding to
(Continued)

the closed-loop power control parameter of the transmission unit i; determining the closed-loop power control parameter of the transmission unit i according to the reference point and the power adjustment amount; and determining the transmit power of uplink data to be transmitted at the transmission unit i according to the closed-loop power control parameter of the transmission unit i.

17 Claims, 4 Drawing Sheets

(51) Int. Cl.
*H04W 76/11* (2018.01)
*H04W 52/14* (2009.01)

(56) References Cited

U.S. PATENT DOCUMENTS

| 2019/0313348 | A1* | 10/2019 | MolavianJazi ..... H04W 52/365 |
| 2021/0282090 | A1 | 9/2021 | Zhang et al. |

FOREIGN PATENT DOCUMENTS

| CN | 103428839 | A | 12/2013 |
| CN | 105359594 | A | 2/2016 |
| CN | 105379368 | A | 3/2016 |
| EP | 3017635 | A1 | 5/2016 |
| EP | 3499980 | A1 | 6/2019 |
| WO | 2012099744 | A2 | 7/2012 |
| WO | 2017197075 | A1 | 11/2017 |
| WO | 2018028104 | A1 | 2/2018 |

OTHER PUBLICATIONS

"Remaining Issues of UL Power Control", May 2018, 3GPP TSG RAN WG1 RAN1 Meeting #93 R1-1807626, Busan, South Korea, Source: MediaTek Inc., Document for: Discussion and Decision, 17 pgs.
Supplementary European Search Report in the European application No. 19843119.9, dated Jul. 13, 2021, 10 pgs.
International Search Report in the international application No. PCT/CN2019/098471, dated Oct. 16, 2019, 2 pgs.
English translation of the Written Opinion of the International Search Authority in the international application No. PCT/CN2019/098471, dated Oct. 16, 2019, 3 pgs.
CMCC, China Southern Power Grid Co., Ltd "Discussion on out-of-order scheduling and HARQ" 3GPP TSG RAN WG1 Meeting #94 R1-1808844 Gothenburg, Sweden, Aug. 20-24, 2018, 5 pgs.
CMCC, China Southern Power Grid "Discussion on out-of-order scheduling and HARQ" 3GPP TSG RAN WG1 Meeting #94bis R1-1811044 Chengdu, China, Oct. 8-12, 2018 5 pgs.
"3rd Generation Partnership Project; Technical Specification Group Radio Access Network; NR; Physical layer procedures for control (Release 15)" 3GPP TS 38.213 V15.2.0 (Jun. 2018), http://www.3gpp.org, 98 pgs.
First Written Opinion of the Singaporean application No. 11202100998V, dated Jun. 29, 2022, 7 pgs.

* cited by examiner

POWER CONTROL METHOD AND DEVICE, TERMINAL, AND STORAGE MEDIUM

CROSS-REFERENCE TO RELATED APPLICATIONS

This application claims priority to Chinese Patent Application No. 201810854475.5, filed on Jul. 30, 2018, the disclosure of which is hereby incorporated by reference in its entirety.

TECHNICAL FIELD

The embodiments of the present disclosure generally relate to, but are not limited to, power control technologies, and more particularly, to a method and device for power control, a terminal, and a storage medium.

BACKGROUND

According to a closed-loop accumulative power control method in the related art, a reference point is a previous physical uplink shared channel (PUSCH) transmission occasion (i.e., transmission period) of the present PUSCH transmission occasion, and a power adjustment value is a delta carried in a transmission power control (TPC) command. From a perspective of a base station, when the base station transmits an uplink (UL) grant for an enhanced mobile broadband (eMBB), the base station takes a PUSCH transmission period (i−1), i.e. the last uplink slot of the first 2.5 ms periodicity as the reference point, and takes delta1 as an accumulated power value. That is, the base station expects a transmission power of the eMBB to be P(i−1)+delta1. While, from a perspective of a user equipment (UE), when transmitting the ultra-reliable and low latency communication (URLLC) data, the reference point is the PUSCH transmission occasion (i−1), and a TPC adjustment value carried in an UL grant for scheduling URLLC service is delta2, and thus the transmission power of URLLC is P(i−1)+delta2. When the UE transmits eMBB data, the reference point changes to the URLLC transmission occasion, namely the fourth slot within the second periodicity, a TPC adjustment value carried in an UL grant for scheduling eMBB service is delta1, and therefore the transmission power of the eMBB is P(i−1)+delta2+delta1, which is different from the transmission power expected by the base station at the time of scheduling the eMBB service. In this way, the power control error occurs, which will lead to demodulation failure or interference increase. In brief, there is a problem in the related art that the closed-loop cumulative power control error occurs due to the inconsistency between the scheduling order and the transmission order.

SUMMARY

In view of the above, the embodiments of the present disclosure provide a method and device for power control, a terminal, and a storage medium, which can solve at least one problem existing in the related art.

The technical solutions of the embodiments of the present disclosure are implemented as follows.

An embodiment of the present disclosure provides a method for power control, which includes that:

a reference point corresponding to a closed-loop power control parameter of a physical uplink shared channel (PUSCH) transmission occasion i is determined;

a power adjustment value corresponding to the closed-loop power control parameter of the PUSCH transmission occasion i determined;

the closed-loop power control parameter of the PUSCH transmission occasion i is determined according to the reference point and the power adjustment value; and a transmission power of uplink data to be transmitted within the PUSCH transmission occasion i is determined according to the closed-loop power control parameter of the PUSCH transmission occasion i.

An embodiment of the present disclosure further provides a device for power control, which includes a first determination unit, a second determination unit, a third determination unit, and a fourth determination unit.

The first determination unit is configured to determine a reference point corresponding to a closed-loop power control parameter of a PUSCH transmission occasion i.

The second determination unit is configured to determine a power adjustment value corresponding to the closed-loop power control parameter of the PUSCH transmission occasion i.

The third determination unit is configured to determine, according to the reference point and the power adjustment value, the closed-loop power control parameter of the PUSCH transmission occasion i.

The fourth determination unit is configured to determine, according to the closed-loop power control parameter of the PUSCH transmission occasion i, a transmission power of uplink data to be transmitted within the PUSCH transmission occasion i.

An embodiment of the present disclosure further provides a terminal, which includes a processor and a memory storing computer instructions executable by the processor. The processor is configured to, when executing the computer instructions, perform the above method for power control.

An embodiment of the present disclosure further provides a computer-readable storage medium having stored therein computer instructions that, when executed by a processor, cause the processor to perform the above method for power control.

According to the method and device for power control, the terminal, and the storage medium provided in the embodiments of the present disclosure, a reference point corresponding to a closed-loop power control parameter of a physical uplink shared channel (PUSCH) transmission occasion i is determined; a power adjustment value corresponding to the closed-loop power control parameter of the PUSCH transmission occasion i is determined; the closed-loop power control parameter of the PUSCH transmission occasion i is determined according to the reference point and the power adjustment value; a transmission power of uplink data to be transmitted within the PUSCH transmission occasion i is determined according to the closed-loop power control parameter of the PUSCH transmission occasion i. Thus, the problem of error in the closed-loop cumulative power control due to the inconsistency between scheduling order and transmission order can be solved.

DETAILED DESCRIPTION

The PUSCH power control method in related art, such as in TS38.213, is shown by the following formula (1):

$$P_{PUSCH,b,f,c}(i, j, q_d, l) = \min \begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix} \quad (1)$$

Where, in formula (1), $P_{CMAX,f,c}(i)$ represents the maximum transmission power of the PUSCH transmission slot i when the UE is on the carrier f of cell c.

$P_{O\_PUSCH,b,f,c}(j)$ and $\alpha_{b,f,c}(j)$ are open-loop power control parameters, $P_{O\_PUSCH\ b,f,c}(j)$ represents a sum of a common power level of all UEs in the cell $P_{0\_NOMINAL\_PUSCH,f,c}(j)$ and a UE-specific power level $P_{0\_UE\_PUSCH,f,c}(j)$; $\alpha_{b,f,c}(j)$ represents a compensation portion for the open-loop path loss; $PL_{b,f,c}(q_d)$ represents the path loss.

For grant free transmission, $P_{0\_UE\_PUSCH,f,c}(j)$ and $\alpha_{b,f,c}(j)$ configure a set of {P0-alpha set} for UE-specific RRC signaling, and then a set of parameters are selected from {P0-alpha set} using the RRC parameter p0alphasetindex, and the selected set of parameters are determined as the open-loop power control parameter.

For grant-based transmission, $P_{0\_UE\_PUSCH,f,c}(j)$ and $\alpha_{b,f,c}(j)$ configure a set of {P0-alpha set} for the UE-specific RRC signaling. Then a set of parameters are selected from {P0-alpha set} based on the SRI filed, and the selected set of the parameters are determined as the open-loop power control parameter; or, the first configured set of parameters are used by default. It should be noted that alpha in {P0-alpha set} denotes $\alpha_{b,f,c}(j)$ in formula (1) and P0 denotes $P_{O\_PUSCH,\ b,f,c}(j)$ in formula (1).

$\Delta_{TF,b,f,c}(i)$ and $f_{b,f,c}(i,l)$ are closed-loop power control parameters: $\Delta_{TF,b,f,c}(i)$ represents power offsets corresponding to different modulation and coding schemes, and $f_{b,f,c}(i,l)$ represents an adjustment value in case of TPC commands. For the convenience of description, delta, delta1, delta2, and the like will be used to present $\Delta_{TF,b,f,c}(i)$ in formula (1) in the following embodiments.

Where $f_{b,f,c}(i,l)=f_{b,f,c}(i-1,l)+\delta_{PUSCH,b,f,c}(i-K_{PUSCH},l)$ represents a closed-loop power adjustment value for the PUSCH transmission slot i when the cumulative power control is enabled, the value of $\delta_{PUSCH,\ b,f,c}(i-K_{PUSCH},l)$ is shown in the following Table 1.

$f_{b,f,c}(i,l)=\delta_{PUSCH,b,f,c}(i-K_{PUSCH},l)$ represents a closed-loop power adjustment value for the PUSCH transmission slot i when the cumulative power control is not enabled, and the value of $\delta_{PUSCH,b,f,c}(i-K_{PUSCH},l)$ is shown in the following Table 1:

TABLE 1

| TPC Command Field | Accumulated $\delta_{PUSCH,\ b,f,c}$ or $\delta_{SRS,b,f,c}$ [dB] | Absolute $\delta_{PUSCH,\ b,f,c}$ or $\delta_{SRS,b,f,c}$ [dB] |
| --- | --- | --- |
| 0 | −1 | −4 |
| 1 | 0 | −1 |
| 2 | 1 | 1 |
| 3 | 3 | 4 |

Figure 1A:
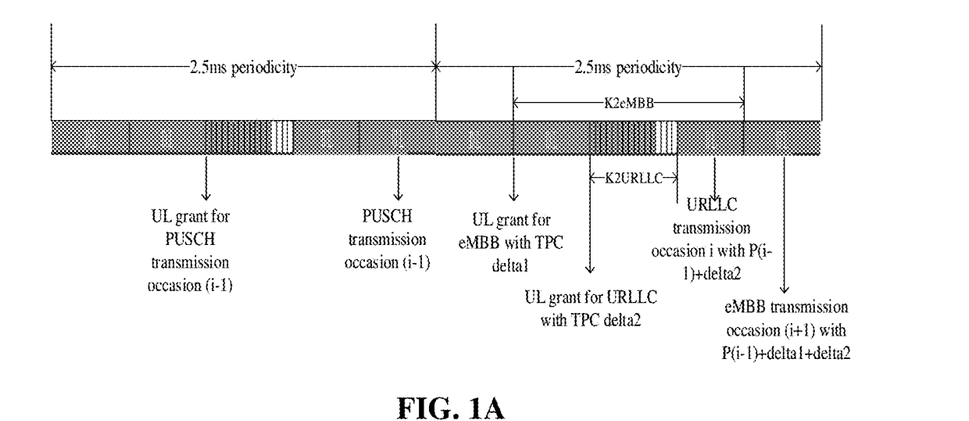
FIG. 1A is a schematic diagram of a multiplexing scenario of URLLC and eMBB in the related art.

In the multiplexing scenario of intra-UE uplink URLLC and eMBB, there will be a situation that the eMBB service arrives first but will be transmitted last, while the URLLC service arrives last but will be transmitted first. As illustrated in FIG. 1A, the subcarrier spacing is 30 kHz, the uplink-downlink switching periodicity is 2.5 ms, and the frame structure configuration is DDDUU, that is, the first three Ds are downlink slots, and the last two Us are uplink slots. In the second 2.5 ms periodicity, the base station transmits, within the second slot, the UL grant for scheduling the eMBB data to be transmitted within the fifth slot. Then the URLLC service arrives, and the delay requirement is stricter. Therefore, the base station transmits, within the third slot, the UL grant for scheduling the URLLC service, and schedules the URLLC data to be transmitted within the fourth slot.

According to the closed-loop accumulative power control method in the related art, the reference point is the previous PUSCH transmission occasion of the present PUSCH transmission occasion, and the power adjustment value is the delta carried in the TPC command. From the perspective of the base station, when the base station transmits the UL grant for the eMBB, the reference point is the PUSCH transmission occasion (i−1), i.e. the last uplink slot of the first 2.5 ms periodicity, and the accumulated power value is delta1. Therefore, the base station expects the transmission power of eMBB to be P(i−1)+delta1. While, from the perspective of the UE, when transmitting the URLLC data, the reference point is PUSCH transmission occasion (i−1), and the TPC adjustment value carried in the UL grant for scheduling URLLC service is delta2, and thus the transmission power of URLLC is P(i−1)+delta2. When the UE transmits eMBB data, the reference point changes to the URLLC transmission occasion, namely the fourth slot within the second periodicity, the TPC adjustment value carried in the UL grant for scheduling eMBB service is delta1, and therefore the transmission power of the eMBB is P(i−1)+delta2+delta1, which is different from the transmission power expected by the base station at the time of scheduling eMBB service. And the power control error occurs, which leads to demodulation failure or interference increase.

Based on the above considerations, an embodiment of the present disclosure provides a method for power control, which can realize appropriate power adjustment when the scheduling order and the transmission order are inconsistent.

The technical solution of the present disclosure is further described below in detail with reference to the accompanying drawings and embodiments.

An embodiment provides a method for power control, which is applied to the terminal. The functions implemented by the method can be implemented by calling program code by the processor in the terminal. Of course, the program code can be stored in the computer storage medium. It can be seen that the terminal comprises at least a processor and a storage medium.

Figure 1B:
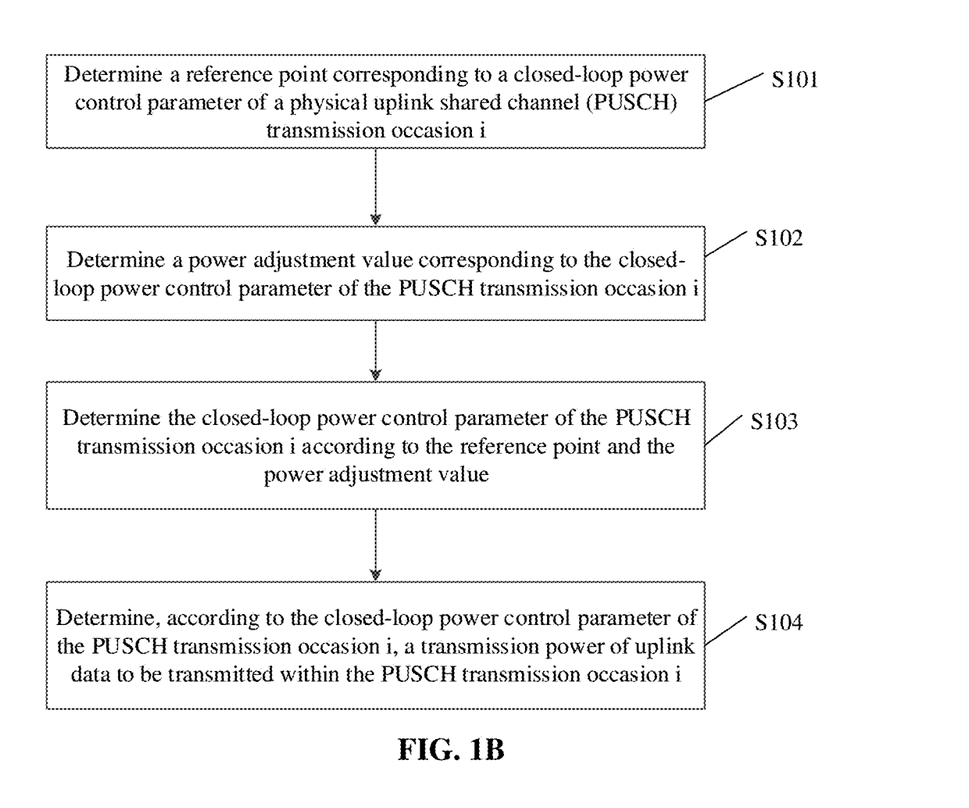
FIG. 1B is a flowchart of a method for power control according to an embodiment of the present disclosure.

FIG. 1B is a flowchart of the method for power control according to an embodiment of the present disclosure. As illustrated in FIG. 1B, the method includes the following operations.

In S101, a reference point corresponding to a closed-loop power control parameter of a physical uplink shared channel (PUSCH) transmission occasion i is determined.

Here, the PUSCH transmission occasion may also be referred to as a PUSCH transmission period. The reference point is a certain PUSCH transmission period, and the closed-loop power control parameter can be understood as $f_{b,f,c}(i,l)$ in the above formula.

In S102, a power adjustment value corresponding to the closed-loop power control parameter of the PUSCH transmission occasion i is determined.

Here, the adjustment value, i.e., delta, is carried in the UL grant, and the UL grant is a type of physical layer control information. The adjustment value is sometimes not just the delta carried by one UL grant, but may be the sum of the deltas carried in several UL grants.

In S103, the closed-loop power control parameter of the PUSCH transmission occasion i is determined according to the reference point and the power adjustment value.

In S104, a transmission power of uplink data to be transmitted within the PUSCH transmission occasion i is determined according to the closed-loop power control parameter of the PUSCH transmission occasion i.

In the embodiment, the closed-loop power control parameter $f_{b,f,c}(i,l)$ is determined according to both the reference point and the adjustment value, and then the transmission power is determined according to the closed-loop power control parameter. It should be noted that the transmission power within a certain PUSCH transmission period may be determined by the solution in the above-mentioned related technology, the solution in the related technology includes more than one open-loop power control parameter and more than one closed-loop power control parameter, and the method for determining one of the closed-loop power control parameters $f_{b,f,c}(i,l)$ is discussed herein.

An embodiment provides a method for power control, which is applied to the terminal. The functions implemented by the method can be implemented by calling program code by the processor in the terminal. Of course, the program code can be stored in the computer storage medium. It can be seen that the terminal comprises at least a processor and a storage medium.

Figure 2:
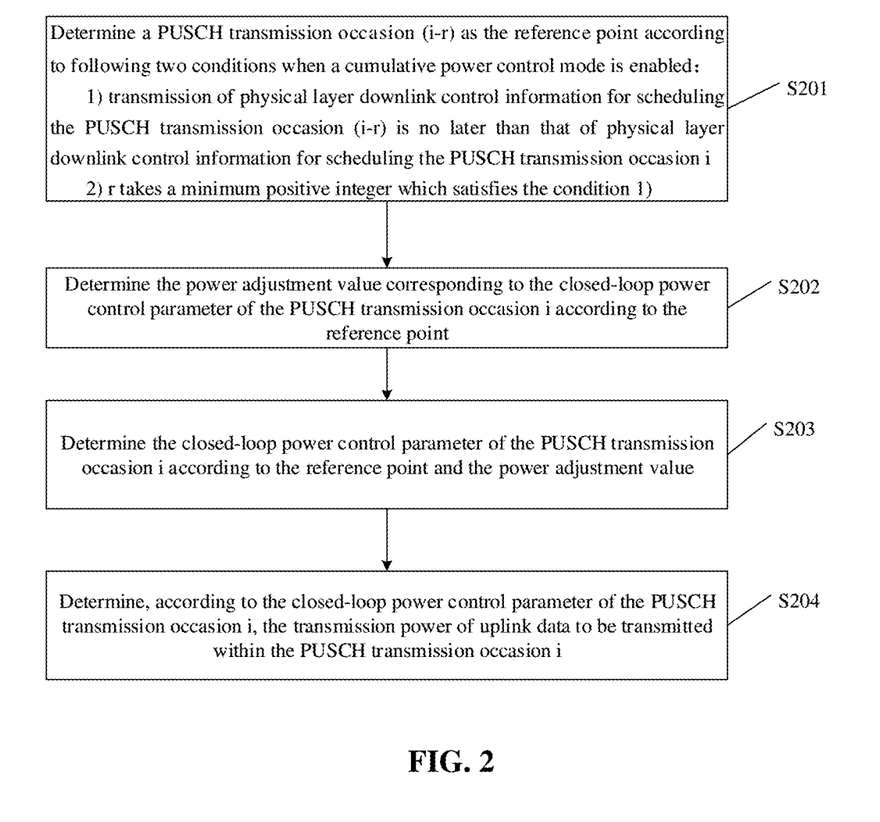
FIG. 2 is a flowchart of a method for power control according to an embodiment of the present disclosure.

FIG. 2 is a flowchart of a method for power control according to an embodiment of the present disclosure. As illustrated in FIG. 2, the method may include the following operations.

In S201, when a cumulative power control mode is enabled, a PUSCH transmission occasion (i−r) is determined as the reference point according to following two conditions.

1) Transmission of physical layer downlink control information for scheduling the PUSCH transmission occasion (i−r) is no later than that of physical layer downlink control information for scheduling the PUSCH transmission occasion i.

2) r takes a minimum positive integer which satisfies the condition 1).

The physical layer downlink control information herein may be a UL grant.

Here, an implementation of S101 "determining a reference point corresponding to a closed-loop power control parameter of a physical uplink shared channel (PUSCH) transmission occasion i" is provided.

Here, the physical uplink shared channel transmission occasion is also referred to as a PUSCH transmission period. The reference point is a certain PUSCH transmission period, and the closed-loop power control parameter can be understood as $f_{b,f,c}(i,l)$ in the above formula.

In S202: a power adjustment value corresponding to a closed-loop power control parameter of the PUSCH transmission occasion i is determined according to the reference point.

Here, the adjustment value, i.e., delta, is carried in the UL grant, and the UL grant is a type of physical layer control information. The adjustment value is sometimes not just the delta carried by one UL grant, but may be the sum of the deltas carried in several UL grants. In this embodiment, if the cumulative power control mode is enabled, the power adjustment value corresponding to the closed-loop power control parameter of the PUSCH transmission occasion i is determined according to the reference point.

In S203: the closed-loop power control parameter of the PUSCH transmission occasion i is determined according to the reference point and the power adjustment value.

In S204, a transmission power of uplink data to be transmitted within the PUSCH transmission occasion i is determined according to the closed-loop power control parameter of the PUSCH transmission occasion i.

An embodiment provides a method for power control, which is applied to the terminal. The functions implemented by the method can be implemented by calling program code by the processor in the terminal. Of course, the program code can be stored in the computer storage medium. It can be seen that the terminal comprises at least a processor and a storage medium. The method may include the following operations.

In S301: when a cumulative power control mode is enabled, a PUSCH transmission occasion (i−r) is determined as the reference point according to following two conditions.

1) Transmission of physical layer downlink control information for scheduling the PUSCH transmission occasion (i−r) is no later than that of physical layer downlink control information for scheduling the PUSCH transmission occasion i.

2) r takes a minimum positive integer which satisfies the condition 1).

Here, the physical layer downlink control information may be a UL grant.

Here, an implementation of S101 "determining a reference point corresponding to a closed-loop power control parameter of a physical uplink shared channel (PUSCH) transmission occasion i" is provided.

Here, the physical uplink shared channel transmission occasion is PUSCH transmission period, the reference point is a certain PUSCH transmission period, and the closed-loop power control parameter can be understood as $f_{b,f,c}(i,l)$ in the above formula.

In S302: all physical layer downlink control information between physical layer downlink control information for scheduling the PUSCH transmission occasion (i−r) and physical layer downlink control information for scheduling the transmission occasion i are determined as a first physical layer downlink control information set.

In S303: the physical layer downlink control information for scheduling the PUSCH transmission occasion (i−r) is removed from the first physical layer downlink control information set, to obtain a second physical layer downlink control information set.

In S304: power adjustment values indicated by TPC commands included in all physical layer downlink control information in the second physical layer downlink control information set are accumulated, to obtain a first accumulated sum.

In S305: the first accumulated sum is determined as the power adjustment value corresponding to the closed-loop power control parameter of the PUSCH transmission occasion i.

Here, operations in S302 to S305 provide an implementation of S202 "determining, according to the reference point, the power adjustment value corresponding to the closed-loop power control parameter of the PUSCH transmission occasion i". The adjustment value, i.e., delta, is carried in the UL grant, and the UL grant is a type of physical layer control information. The adjustment value is sometimes not just the delta carried in one UL grant, but may be the sum of the deltas carried in several UL grants. In this embodiment, if the cumulative power control mode is enabled, the power adjustment value corresponding to the closed-loop power control parameter of the PUSCH transmission occasion i is determined according to the reference point.

In S306: the closed-loop power control parameter of the PUSCH transmission occasion i is determined according to the reference point and the power adjustment value.

In S307: the transmission power of uplink data to be transmitted within the PUSCH transmission occasion i is determined according to the closed-loop power control parameter of the PUSCH transmission occasion i.

An embodiment provides a method for power control, which is applied to the terminal. The functions implemented by the method can be implemented by calling program code by the processor in the terminal. Of course, the program code can be stored in the computer storage medium. It can be seen that the terminal comprises at least a processor and a storage medium.

In the embodiment, the method is described by taking the case of r=1 as an example. The method may include the following operations.

In S401: when a cumulative power control mode is enabled, the PUSCH transmission occasion (i−1) is determined as the reference point.

Here, the physical layer downlink control information may be a UL grant.

Here, an implementation of S101 "determining a reference point corresponding to a closed-loop power control parameter of a physical uplink shared channel (PUSCH) transmission occasion i" is provided.

Here, the physical uplink shared channel transmission occasion is PUSCH transmission period, the reference point is a certain PUSCH transmission period, and the closed-loop power control parameter can be understood as $f_{b,f,c}(i,l)$ in the above formula.

In S402: power adjustment values indicated by TPC commands included in all physical layer downlink control information between the PUSCH transmission occasion (i−1) and the PUSCH transmission occasion i are accumulated, to obtain a second accumulated sum.

In S403: the second accumulated sum is determined as the power adjustment value corresponding to the closed-loop power control parameter of the PUSCH transmission occasion i.

Here, operations in S402 and S403 provide an implementation of S202 when r=1.

Here, the adjustment value, i.e., delta, is carried in the UL grant, and the UL grant is a type of physical layer control information. The adjustment value is sometimes not just the delta carried in one UL grant, but may be the sum of the deltas carried in several UL grants. In this embodiment, if the cumulative power control mode is enabled, the power adjustment value corresponding to the closed-loop power control parameter of the PUSCH transmission occasion i is determined according to the reference point.

In S404: the closed-loop power control parameter of the PUSCH transmission occasion i is determined according to the reference point and the power adjustment value.

In S405: the transmission power of uplink data to be transmitted within the PUSCH transmission occasion i is determined according to the closed-loop power control parameter of the PUSCH transmission occasion i.

The difference between the previous embodiment (the embodiment shown in S301 to S307, hereinafter referred to as a first embodiment) and the present embodiment (the embodiment shown in S401 to S405, hereinafter referred to as a third embodiment) is that the first embodiment relates to a sum of deltas included in UL grants between two points (the reference point and the PUSCH transmission occasion i), the two points being actually the UL grant corresponding to the PUSCH transmission occasion (i−r) and the UL grant corresponding to the PUSCH transmission occasion i, respectively; while, although the third embodiment also relates to a sum of deltas included in the UL granted between two points, the two points are PUSCH transmission occasion (i−1) and PUSCH transmission occasion i respectively. The PUSCH transmission occasion corresponds to one PUSCH (data) transmission opportunity, and the UL grant corresponds to one PDCCH transmission opportunity. That is, both the PUSCH transmission occasion and the UL grant correspond to transmission opportunities, where one is the PUSCH transmission occasion and the other is the PDCCH transmission occasion.

An embodiment provides a method for power control, which is applied to the terminal. The functions implemented by the method can be implemented by calling program code by the processor in the terminal. Of course, the program code can be stored in the computer storage medium. It can be seen that the terminal comprises at least a processor and a storage medium. The method may include the following operations.

In S501: higher layer signaling is received from a base station, the higher layer signaling including multiple open-loop power control parameter sets.

In S502: one open-loop power control parameter set is selected from the multiple open-loop power control parameters sets according to selection information of an open-loop power control parameter.

In S503: a reference point corresponding to a closed-loop power control parameter of the PUSCH transmission occasion i is determined.

Here, the physical uplink shared channel transmission occasion is PUSCH transmission period, the reference point is a certain PUSCH transmission period, and the closed-loop power control parameter can be understood as $f_{b,f,c}(i,l)$ in the above formula.

In S504: a power adjustment value corresponding to the closed-loop power control parameter of the PUSCH transmission occasion i is determined.

Here, the adjustment value, i.e., delta, is carried in the UL grant, and the UL grant is a type of physical layer control information. The adjustment value is sometimes not just the delta carried in one UL grant, but may be the sum of the deltas carried in several UL grants.

In S505: the closed-loop power control parameter of the PUSCH transmission occasion i is determined according to according to the reference point and the power adjustment value.

In S506: the transmission power of uplink data to be transmitted within the PUSCH transmission occasion i is determined according to the closed-loop power control parameter of the PUSCH transmission occasion i and the selected open-loop power control parameter set.

Here, operations in S506 provide an implementation of S104.

In the embodiment, the base station configures a plurality of sets of open-loop power control parameter {P0-alpha} for the terminal through higher layer signaling (also referred to as higher layer configuration information), and a different open-loop power control parameter set {P0-alpha} has a mapping with at least one piece of the selection information of the open-loop power control parameter. The selection information of the open-loop power control parameter comprises one of: a different logical channel group, a radio network temporary identifier (RNTI) group for scrambling physical layer downlink control information for scheduling data to be transmitted, or first indication information in physical layer downlink control information for scheduling data to be transmitted.

The terminal receives the higher layer signaling from the base station, and select the corresponding open-loop power control parameter according to the logical channel group corresponding to the data to be transmitted, or according to the RNTI for scrambling physical layer downlink control information for scheduling data to be transmitted, or according to the first indication information in physical layer downlink control information for scheduling data to be transmitted.

In other embodiments, the selection information of the open-loop power control parameter comprises one of:

a logical channel group, a RNTI group for scrambling physical layer downlink control information for scheduling data to be transmitted, or the first indication information in physical layer downlink control information for scheduling data to be transmitted.

One open-loop power control parameter set has a mapping with at least one piece of the selection information of the open-loop power control parameter.

In other embodiments, when the cumulative power control mode is enabled, the operation of determining the reference point corresponding to the closed-loop power control parameter of the PUSCH transmission occasion i may include the following operations.

The PUSCH transmission occasion (i−r) is determined as the reference point according to following two conditions:

1) the PUSCH transmission occasion (i−r) is determined according to one of following conditions.

i) an open-loop power control parameter set selected for the PUSCH transmission occasion (i−r) and an open-loop power control parameter set selected for the PUSCH transmission occasion i are the same.

ii) data transmitted within the PUSCH transmission occasion (i−r) and data transmitted within the PUSCH transmission occasion i belong to a same service type group or a same logical channel group.

iii) a RNTI for scrambling physical layer downlink control information for scheduling the PUSCH transmission occasion (i−r) and a RNTI for scrambling physical layer downlink control information for scheduling the PUSCH transmission occasion i belong to a same RNTI group; or iv) first indication information included in physical layer downlink control information for scheduling the PUSCH transmission occasion (i−r) and first indication information included in physical layer downlink control information for scheduling the PUSCH transmission occasion i are the same.

2) r takes a minimum positive integer which satisfies the condition 1).

In other embodiments, when the cumulative power control mode is enabled, the operation of determining the power adjustment value corresponding to the closed-loop power control parameter of the PUSCH transmission occasion i may include the following operations.

The power adjustment value indicated by the TPC command included in physical layer downlink control information of the PUSCH transmission occasion i is determined as the power adjustment value corresponding to the closed-loop power control parameter of the PUSCH transmission occasion i.

In the embodiment, the reference point is $f_{b,f,c}(i-r, 1)$, which is required to satisfy two conditions: 1) the open-loop power control parameter selected for the PUSCH transmission period (i−r) and the open-loop power control parameter selected for the PUSCH transmission period i are the same; or the data transmitted within the PUSCH transmission period (i−r) and data transmitted within the PUSCH transmission period i belong to the same service type group or the same logical channel group; or the RNTI for scrambling physical layer downlink control information for scheduling the PUSCH transmission period (i−r) and the RNTI for scrambling physical layer downlink control information for scheduling the PUSCH transmission period i belong to a same RNTI group; or the first indication information included in physical layer downlink control information for scheduling the PUSCH transmission period (i−r) and first indication information included in physical layer downlink control information for scheduling the PUSCH transmission period i are the same. 2) r takes a minimum positive integer which satisfies the condition 1).

In the embodiment, the adjustment value is $\delta_{PUSCH,b,f,c}(i-K_{PUSCH},1)$, i.e., the delta indicated by the TPC command included in the UL grant corresponding to the PUSCH transmission period i.

A power control method is provided to perform suitable power adjustment for the error in the closed-loop cumulative power control caused by the inconsistency between the scheduling order and the transmission order.

First Solution

The terminal receives a TPC command from the base station, and determines the transmission power of uplink data to be transmitted within the PUSCH transmission occasion i. Specifically, when the cumulative power control mode is enabled, $f_{b,f,c}(i,1)$ in formula (1) can be determined by the formula (2), that is, formula (2) is substituted into formula (1):

$$P_{PUSCH,b,f,c}(i, j, q_d, l) = \min \left\{ \begin{array}{l} P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{array} \right\}; \quad (1)$$

-continued $$f_{b,f,c}(i, l) = \qquad (2)$$
$$f_{b,f,c}(i-r, l) + \sum_{ULgrant_{i-r} \leq s - K_{PUSCH} \leq ULgrant_i} \delta_{PUSCH,b,f,c}(s - K_{PUSCH}, l).$$

The reference point is $f_{b,f,c}(i-r,l)$, which is required to satisfy two conditions: 1) transmission of a UL grant for scheduling the PUSCH transmission occasion (i−r) is no later than that of a UL grant for scheduling the PUSCH transmission occasion i; 2) r takes a minimum positive integer which satisfies the condition 1).

The adjustment value is $$\sum_{ULgrant_{i-r} < s - K_{PUSCH} \leq ULgrant_i} \delta_{PUSCH,b,f,c}(s - K_{PUSCH}, l),$$

i.e., the sum of all deltas between the UL grant (not included) corresponding to the PUSCH transmission occasion (i−r) and the UL grant (included) corresponding to the PUSCH transmission occasion i.

First Example

Figure 3:
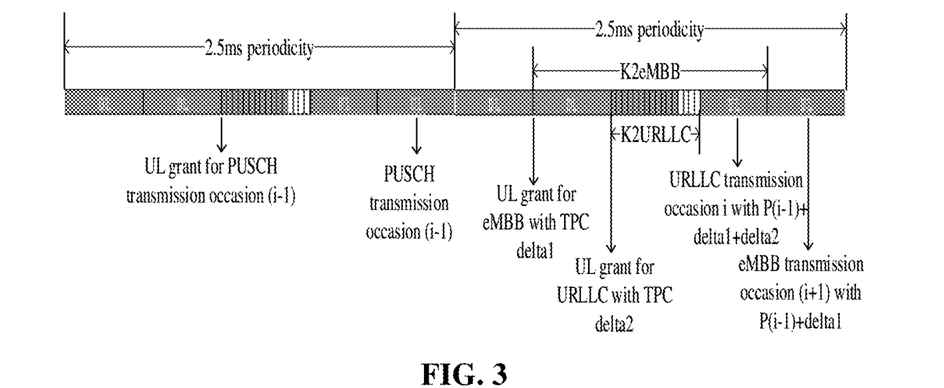
FIG. 3 is a first schematic diagram of a multiplexing scenario of URLLC and eMBB according to an embodiment of the present disclosure.

In the frame structure as illustrated in FIG. 3, an uplink multiplexing scenario of intra-UE URLLC and eMBB is provided. There are three PUSCH transmission occasions: PUSCH transmission occasion (i−1), PUSCH transmission occasion i (corresponding to the URLLC transmission occasion) and PUSCH transmission occasion (i+1) (corresponding to the eMBB transmission occasion). If $f_{b,f,c}(i,l)$ and $f_{b,f,c}(i+1,l)$ are determined according to the first solution:

For the URLLC data (transmitted within the fourth slot of the second periodicity), r=1, that is, the reference point is $f_{b,f,c}(i-1, l)$. Delta1 and delta2 are included between the UL grant (not included) corresponding to the PUSCH transmission occasion (i−1) and the UL grant (included) corresponding to the PUSCH transmission occasion i, that is, the adjustment value is delta1+delta2, then the $f_{b,f,c}(i,l)$ of the URLLC is determined by $f_{b,f,c}(i,l)$+delta1+delta2.

For the eMBB data (transmitted within the fifth slot of the second periodicity), r=2, that is, the reference point is $f_{b,f,c}(i-1,l)$ (because the eMBB transmission occasion is the $(i+1)^{th}$ transmission occasion). Delta1 is included between the UL grant (not included) corresponding to the PUSCH transmission occasion (i−1) and the UL grant (included) corresponding to the PUSCH transmission occasion (i+1), that is, the adjustment value is delta1, then the $f_{b,f,c}(i+1,l)$ of the eMBB is determined by $f_{b,f,c}(i-1,l)$+delta1.

Second Solution

The base station configures a plurality of sets of open-loop power control parameter {P0-alpha} for the terminal through higher layer signaling, the terminal determines the transmission power of uplink data to be transmitted within the PUSCH transmission occasion i by receiving the higher layer signaling and the physical control information (including TPC commands) from the base station. The higher layer signaling may include RRC signaling and broadcast signaling.

Specifically, the base station configures a plurality of sets of open-loop power control parameter {P0-alpha} for the terminal through higher layer signaling, and an open-loop power control parameter set {P0-alpha} has a mapping with at least one logical channel group, or at least one RNTI group for scrambling physical layer downlink control information for scheduling data to be transmitted, or at least one piece of first indication information in physical layer downlink control information for scheduling data to be transmitted.

The terminal receives the higher layer signaling from the base station, and selects the corresponding open-loop power control parameter according to the logical channel group corresponding to the data to be transmitted, or according to the RNTI for scrambling physical layer downlink control information for scheduling data to be transmitted, or according to the first indication information in physical layer downlink control information for scheduling data to be transmitted.

The terminal receives the TPC commands from the base station, and determines, according to the selected open-loop power control parameter and the TPC commands, the transmission power of uplink data to be transmitted within the PUSCH transmission occasion i according to the following formula. When the cumulative power control mode is enabled, $f_{b,f,c}(i,l)$ in formula (1) can be determined by the formula (3), that is, formula (3) is substituted into formula (1):

$$P_{PUSCH,b,f,c}(i, j, q_d, l) = \qquad (1)$$
$$\min\left\{\begin{array}{l} P_{CMAX,f,c}(i), \\ P_{O\_PUSCH,b,f,c}(j) + 10\log_{10}(2^\mu \cdot M^{PUSCH}_{RB,b,f,c}(i)) + \\ \alpha_{b,f,c}(j) \cdot PL_{b,f,c}(q_d) + \Delta_{TF,b,f,c}(i) + f_{b,f,c}(i, l) \end{array}\right\};$$

$$f_{b,f,c}(i,l) = f_{b,f,c}(i-r,l) + \delta_{PUSCH,b,f,c}(i-K_{PUSCH},l) \qquad (3)$$

The reference point is $f_{b,f,c}(i-r,l)$, which is required to satisfy two conditions: 1) the open-loop power control parameter selected for the PUSCH transmission occasion (i−r) and the open-loop power control parameter selected for the PUSCH transmission occasion i are the same; or the data transmitted within the PUSCH transmission occasion (i−r) and the data transmitted within the PUSCH transmission occasion i belong to the same service type or the same service type group or the same logical channel group; or the RNTI for scrambling physical layer downlink control information for scheduling the PUSCH transmission occasion (i−r) and the RNTI for scrambling physical layer downlink control information for scheduling the PUSCH transmission occasion i belong to the same RNTI group; or the first indication information included in physical layer downlink control information for scheduling the PUSCH transmission occasion (i−r) and the first indication information included in physical layer downlink control information for scheduling the PUSCH transmission occasion i are the same. 2) r takes a minimum positive integer which satisfies the condition 1).

The adjustment value is $\delta_{PUSCH,b,f,c}(i-K_{PUSCH},l)$, i.e., delta indicated by the TPC command included in the UL grant corresponding to the PUSCH transmission occasion i.

Second Example

The base station configures two open-loop power control parameter sets, i.e., {P0$_1$-alpha$_1$} and {P0$_2$-alpha$_2$} for the terminal through higher layer signaling. Here, {P0$_1$-alpha$_1$} corresponds to the URLLC service and the DCI for scheduling the URLLC service is scrambled by using new RNTI, and {P0$_2$-alpha$_2$} corresponds to the eMBB service and the DCI for scheduling the eMBB service is scrambled by using C-RNTI.

Figure 4:
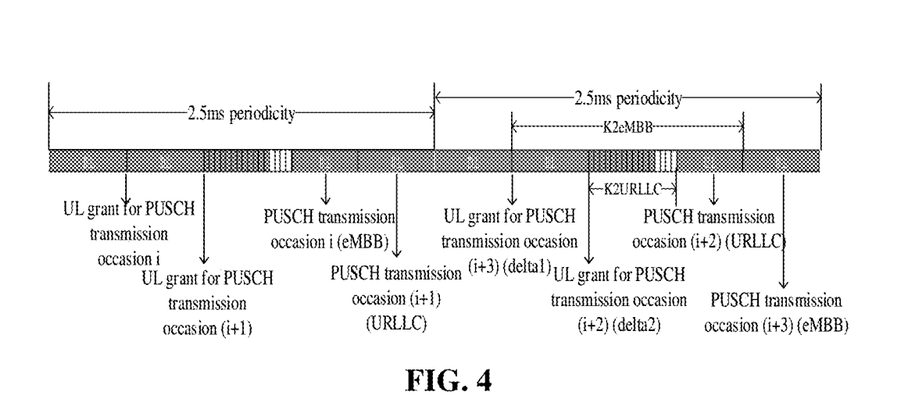
FIG. 4 is a second schematic diagram of a multiplexing scenario of URLLC and eMBB according to an embodiment of the present disclosure.

In the frame structure as illustrated in FIG. 4, there are four PUSCH transmission occasions: the PUSCH transmission occasion i, the PUSCH transmission occasion (i+1), the PUSCH transmission occasion (i+2), and the PUSCH transmission occasion (i+3). The PUSCH transmission occasion i and the PUSCH transmission occasion (i+3) are transmission occasions for eMBB, and the PUSCH transmission occasion (i+1) and the PUSCH transmission occasion (i+2) are transmission occasions for URLLC. According to the second solution, the PUSCH transmission occasion i and the PUSCH transmission occasion (i+3) are used for transmitting eMBB service, the DCI for scheduling the two PUSCH transmission occasions is scrambled by using C-RNTI, and the selected open-loop power control parameter is {P0$_2$-alpha$_2$}; the PUSCH transmission occasion (i+1) and the PUSCH transmission occasion (i+2) are used for transmitting URLLC service, the DCI for scheduling the two PUSCH transmission occasions is scrambled by using new RNTI, and the selected open-loop power control parameter is {P0$_1$-alpha$_1$}.

For the URLLC service transmitted within the PUSCH transmission occasion (i+2), the reference point of $f_{b,f,c}(i+2,l)$ is the PUSCH transmission occasion (i+1), the adjustment value is delta2, i.e., the formula (4):

$$f_{b,f,c}(i+2,l) = f_{b,f,c}(i+1,l) + \text{delta2} \quad (4).$$

For the eMBB service transmitted within the PUSCH transmission occasion (i+3), the reference point of $f_{b,f,c}(i+3,l)$ is the PUSCH transmission occasion i, the adjustment value is delta1, that is, $f_{b,f,c}(i+3, l) = f_{b,f,c}(i,l) + \text{delta1}$.

Third Solution

The terminal receives the TPC commands transmitted by the base station, and determines the transmission power of uplink data to be transmitted within the PUSCH transmission occasion i. Specifically, when the cumulative power control mode is enabled, $f_{b,f,c}(i,l)$ in formula (1) can be determined by the formula (5), that is, formula (5) is substituted into formula (1):

$$P_{PUSCH,b,f,c}(i, j, q_d, l) = \min\begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix}; \quad (1)$$

$$f_{b,f,c}(i, l) = f_{b,f,c}(i-1, l) + \sum_{i-1 \le s - K_{PUSCH} \le i} \delta_{PUSCH,b,f,c}(s - K_{PUSCH}, l). \quad (5)$$

The reference point is PUSCH transmission occasion $f_{b,f,c}(i-r,l)$. The adjustment value is $$\sum_{i-1 \le s - K_{PUSCH} \le i} \delta_{PUSCH,b,f,c}(s - K_{PUSCH}, l),$$

namely the sum of all deltas between the PUSCH transmission occasion (i−1) and the PUSCH transmission occasion i.

Third Example

Figure 5:
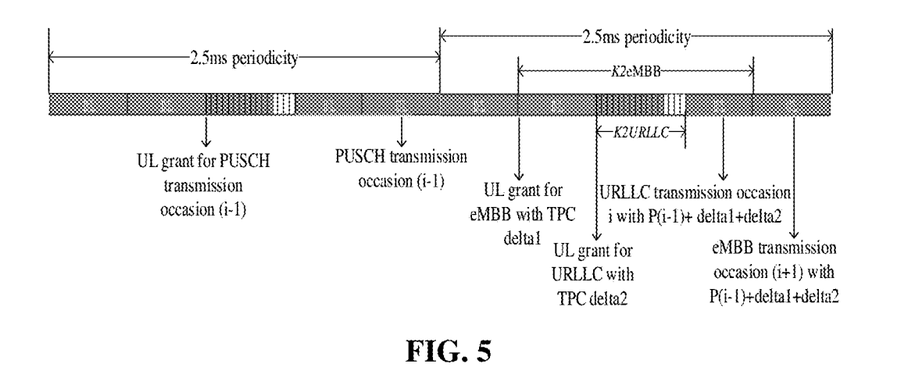
FIG. 5 is a third schematic diagram of a multiplexing scenario of URLLC and eMBB according to an embodiment of the present disclosure.

In the frame structure illustrated in FIG. 5, an uplink multiplexing scenario of intra-UE URLLC and eMBB is provided. There are three PUSCH transmission occasions: PUSCH transmission occasion (i−1), PUSCH transmission occasion i (corresponding to the URLLC transmission occasion) and PUSCH transmission occasion (i+1) (corresponding to the eMBB transmission occasion). If $f_{b,f,c}(i,l)$ and $f_{b,f,c}(i+1,l)$ are determined according to the third solution:

For the URLLC data (transmitted within the fourth slot of the second occasion), the reference point is $f_{b,f,c}(i-1,l)$. Delta1 and delta2 are included between the PUSCH transmission occasion (i−1) and the PUSCH transmission occasion i, that is, the adjustment value is delta1+delta2, then the $f_{b,f,c}(i,l)$ of URLLC is determined by $f_{b,f,c}(i-1,l)+\text{delta1}+\text{delta2}$.

For the eMBB data (transmitted within the fifth slot of the second periodicity), that is, the reference point is $f_{b,f,c}(i,l)$, there is no any delta included between the PUSCH transmission occasion i and the PUSCH transmission occasion (i+1), that is, the adjustment value is 0, then the $f_{b,f,c}(i+1,l)$ of eMBB is determined by $f_{b,f,c}(i,l)+0=f_{b,f,c}(i-1,l)$ delta1+delta2.

In particular, in the above three solutions, refer to Table 2, the terminal can make different interpretations of the TPC table for different services. For example, for service type 1, the TPC takes the values of 0, 1, 2 and 3, which correspond to −1 dB, 0 dB, 1 dB and 3 dB, respectively. For the service type 2, the TPC takes values of 0, 1, 2 and 3, which correspond to (−1−j) dB, 0 dB, (1+j) dB and (3+j) dB, respectively. That is, the TPC adjustment step of the service type 2 is equal to the TPC adjustment step of the service type 1 plus the adjustment value of j dB. Specifically, j may be 1) written in the standard, 2) configured by the base station through higher layer signaling.

TABLE 2

| TPC Command Field | Accumulated [dB] | |
| --- | --- | --- |
| 0 | −1 | −1 − j |
| 1 | 0 | 0 |
| 2 | 1 | 1 + j |
| 3 | 3 | 3 + j |

Compared with the related art, the present embodiment has the following technical advantages: in the multiplexing scenario of intra-UE UL URLLC and eMBB, a power control method is provided to perform appropriate power adjustment, improve demodulation correctness and reduce interference in view of the error in closed-loop cumulative power control caused by inconsistency between scheduling order and transmission order (inconsistent interpretation between the base station and the UE).

Based on the foregoing embodiments, an embodiment of the present disclosure provides a device for power control. The device includes all units included and modules included in each unit, which may be implemented by the processor in the terminal; of course, it can also be implemented by a specific logic circuit. In the process of implementation, the processor may be a central processing unit (CPU), a microprocessor (MPU), a digital signal processor (DSP), a field programmable gate array (FPGA), or the like.

Figure 6:
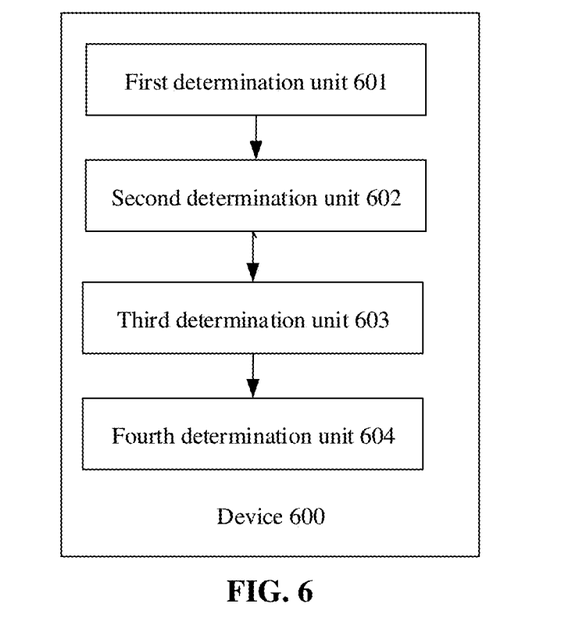
FIG. 6 is a schematic structure diagram of a device for power control according to an embodiment of the present disclosure.

FIG. 6 is a schematic structure diagram of the device for power control according to an embodiment of the present disclosure. As illustrated in FIG. 6, the device 600 includes a first determination unit, a second determination unit, a third determination unit, and a fourth determination unit.

The first determination unit 601 is configured to determine a reference point corresponding to a closed-loop power control parameter of a physical uplink shared channel (PUSCH) transmission occasion i.

The second determination unit 602 is configured to determine a power adjustment value corresponding to the closed-loop power control parameter of the PUSCH transmission occasion i.

The third determination unit 603 is configured to determine the closed-loop power control parameter of the PUSCH transmission occasion i according to the reference point and the power adjustment value.

The fourth determination unit 604, configured to determine, according to the closed-loop power control parameter of the PUSCH transmission occasion i, a transmission power of uplink data to be transmitted within the PUSCH transmission occasion i.

In other embodiments, when a cumulative power control mode is enabled, the first determination unit is configured to determine the PUSCH transmission occasion (i−r) as the reference point according to following two conditions.

1) Transmission of physical layer downlink control information for scheduling the PUSCH transmission occasion (i−r) is no later than that of physical layer downlink control information for scheduling the PUSCH transmission occasion i.

2) r takes a minimum positive integer which satisfies the condition 1).

Correspondingly, the second determination unit is configured to determine, according to the reference point, the power adjustment value corresponding to the closed-loop power control parameter of the PUSCH transmission occasion i.

In other embodiments, the second determination unit may include a first determination module, a second determination module, a first accumulation module, and a third determination module.

The first determination module is configured to determine all physical layer downlink control information between the physical layer downlink control information for scheduling the PUSCH transmission occasion (i−r) and the physical layer downlink control information for scheduling the transmission occasion i as a first physical layer downlink control information set.

The second determination module is configured to remove the physical layer downlink control information for scheduling the PUSCH transmission occasion (i−r) from the first physical layer downlink control information set, to obtain a second physical layer downlink control information set.

The first accumulation module is configured to accumulate power adjustment values indicated by TPC commands included in all physical layer downlink control information in the second physical layer downlink control information set, to obtain a first accumulated sum.

The third determination module is configured to determine the first accumulated sum as the power adjustment value corresponding to the closed-loop power control parameter of the PUSCH transmission occasion i.

In other embodiments, when r=1, the first determination unit is further configured to determine the PUSCH transmission occasion (i−1) as the reference point corresponding to the closed-loop power control parameter of the PUSCH transmission occasion i.

Correspondingly, the second determination unit may include a second accumulation module and a fourth determination module.

The second accumulation module is configured to accumulate power adjustment values indicated by TPC commands included in all physical layer downlink control information between the PUSCH transmission occasion (i−1) and the PUSCH transmission occasion i, to obtain a second accumulated sum.

The fourth determination module is configured to determine the second accumulated sum as the power adjustment value corresponding to the closed-loop power control parameter of the PUSCH transmission occasion i.

In other embodiments, the device may include a receiving unit and a selection unit.

The receiving unit is configured to receive higher layer signaling from a base station, the higher layer signaling including multiple open-loop power control parameter sets.

The selection unit is configured to select, according to selection information of an open-loop power control parameter, one open-loop power control parameter set from the plurality of open-loop power control parameters sets.

Correspondingly, the fourth determination unit is configured to determine, according to the closed-loop power control parameter of the PUSCH transmission occasion i and the open-loop power control parameter set, the transmission power of the uplink data to be transmitted within the PUSCH transmission occasion i.

In other embodiments, the selection information of the open-loop power control parameter may include one of:

a logical channel group; a RNTI group for scrambling physical layer downlink control information for scheduling data to be transmitted; first indication information in physical layer downlink control information for scheduling data to be transmitted.

One open-loop power control parameter set has a mapping with at least one piece of the selection information of the open-loop power control parameter.

In other embodiments, when a cumulative power control mode is enabled, the first determination unit is configured to:

determine the PUSCH transmission occasion (i−r) as the reference point according to following two conditions:

1) determining the PUSCH transmission occasion (i−r) according to one of following conditions:

i) an open-loop power control parameter set selected for the PUSCH transmission occasion (i−r) and an open-loop power control parameter set selected for the PUSCH transmission occasion i are the same;

ii) data transmitted within the PUSCH transmission occasion (i−r) and data transmitted within the PUSCH transmission occasion i belong to a same service type group or a same logical channel group;

iii) a RNTI for scrambling physical layer downlink control information for scheduling the PUSCH transmission occasion (i−r) and a RNTI for scrambling physical layer downlink control information for scheduling the PUSCH transmission occasion i belong to a same RNTI group; or iv) first indication information included in physical layer downlink control information for scheduling the PUSCH transmission occasion (i−r) and first indication information included in physical layer downlink control information for scheduling the PUSCH transmission occasion i are the same.

2) r takes a minimum positive integer which satisfies the condition 1).

In other embodiments, when a cumulative power control mode is enabled, the second determination unit is configured to determine the power adjustment value indicated by a TPC command included in physical layer downlink information of the PUSCH transmission occasion i as the power adjustment value corresponding to the closed-loop power control parameter of the PUSCH transmission occasion i.

The above description of the embodiments of the device is similar to the above description of the embodiments of the method, and has similar advantageous effects as the embodiments of the method. For technical details that not disclosed in the embodiments of device of the present disclosure, please refer to the description of the embodiment of method of the present disclosure.

It should be noted that, in the embodiment of the present disclosure, if the method for power control described above is implemented in the form of a software functional module and is sold or used as an independent product, it may be stored in a computer-readable storage medium. Based on such an understanding, the technical solution of the embodiments of the present disclosure, in essence, or the part that contributes to the related art, may be embodied in the form of a software product, which is stored in the storage medium and includes several instructions for causing a terminal to perform all or part of the methods described in the various embodiments of the present disclosure. The foregoing storage medium includes a USB flash drive, a removable hard disk, a read only memory (ROM), a magnetic disk, an optical disk, or any other medium that can store program code. Thus, the embodiments of the present disclosure are not limited to any particular combination of hardware and software.

Correspondingly, an embodiment of the present disclosure provides a terminal includes a memory and a processor, the memory storing computer instructions executable by the processor. The processor is configured to, when executing the computer instructions, perform the above method for power control.

Correspondingly, an embodiment of the present disclosure provides a computer-readable storage medium having stored therein computer instructions that, when executed by a processor, cause the processor to perform the above method for power control.

It should be noted herein that the above description of the embodiments of the storage medium and the device are similar to the above description of the embodiments of the method and have similar advantageous effects as those of the embodiments of the method. The technical details that not disclosed in the embodiments of the storage medium and the device of the present disclosure, please refer to the description of the embodiments of the method of the present disclosure.

Figure 7:
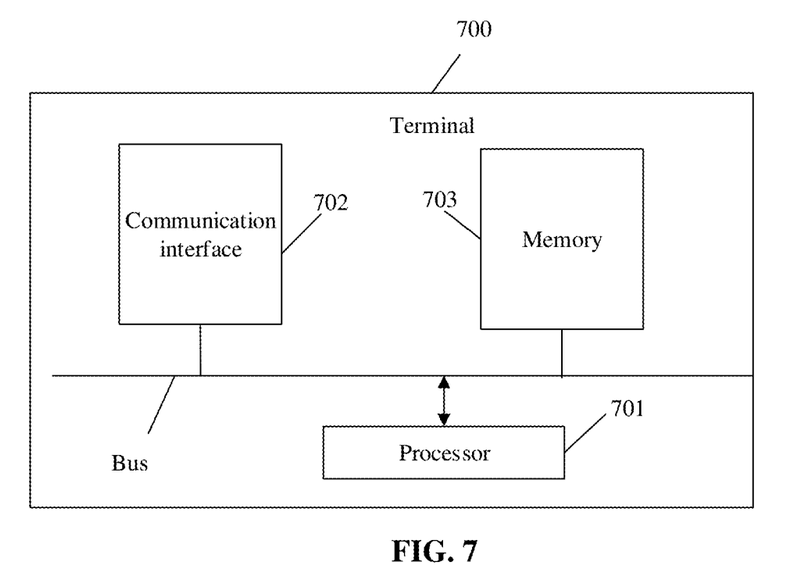
FIG. 7 is a schematic diagram of hardware entities of a terminal according to an embodiment of the present disclosure.

It should be noted that FIG. 7 is a schematic diagram of hardware entities of the terminal according to an embodiment of the present disclosure. As illustrated in FIG. 7, the hardware entities of the terminal 700 include the processor 701, the communication interface 702, and the memory 703.

The processor 701 generally controls the overall operation of the terminal 700.

The communication interface 702 may enable the terminal to communicate with other terminals or servers over the network.

The memory 703 is configured to store instructions and applications executable by the processor 701, and may also cache data (e.g., image data, audio data, voice communication data, and video communication data) to be or have been processed by the modules in the processor 701 and the terminal 700, which may be implemented by the flash memory or the random access memory.

It should be understood that references to "an embodiment" or "the embodiment" throughout the description mean that the particular features, structures or characteristics associated with an embodiment are included in at least one embodiment of the present disclosure. Thus, "in an embodiment" or "in the embodiment" appearing throughout the description does not necessarily refer to the same embodiment. Further, these particular features, structures, or characteristics may be incorporated in one or more embodiments in any suitable manner. It should be understood that, in various embodiments of the present disclosure, the sequence number of the above-described processes does not mean the order of the implementation, the order of the implementation of the processes should be determined according to their functions and internal logic, and should not constitute any limitation on the implementation of the embodiments of the present disclosure. The above embodiments of the present disclosure are numbered merely for description, and do not represent the advantages or disadvantages of the embodiments.

It is to be noted that, in this disclosure, the terms "comprise", "include" or any other variant thereof are intended to cover non-exclusive inclusions, such that the process, method, product, or device that includes a series of elements includes not only those elements, but also other elements that are not explicitly listed, or elements inherent to such a process, method, article, or device. Without further limitation, the elements defined by the expression "comprise a . . . " do not preclude the existence of additional identical element in the process, method, article, or device including that element.

In several embodiments of the present disclosure, it should be understood that the disclosed device and method may be implemented in other ways. The embodiments of the device described above are merely illustrative. For example, the division of the units is merely a logical function division, and may be implemented in other ways, such as, multiple units or components may be combined, or may be integrated into another system, or some features may be ignored or not performed. In addition, the components shown or discussed may be coupled, or directly coupled, or communicatively connected to one another through some interfaces, the indirect coupling or communicative connection of the device or unit may be electrical, mechanical, or other forms.

The units described above as separate components may or may not be physically separated, and the components displayed as units may or may not be physical units. They may be located in one place, or may be distributed over multiple network units. Some or all of the units may be selected to achieve the objectives of the solutions of the present embodiment according to the actual needs.

In addition, each functional unit in the embodiments of the present disclosure may be all integrated in one processing unit, or each unit may be as one unit separately, or two or more units may be integrated in one unit. The integrated unit may be implemented in the form of hardware or in the form of hardware functional units and software functional units.

It is understood by those of ordinary skill in the art that all or part steps to implement the embodiments of the method may be implemented by the hardware related to the program instructions, the program may be stored in the computer readable storage medium and performs the steps of the embodiments of the method when executed. The foregoing storage medium comprises a removable storage device, a read only memory (ROM), a magnetic disk, an optical disk, or any other medium that can store program code.

Alternatively, if the above integrated unit of the present disclosure is implemented in the form of a software functional module and is sold or used as an independent product, it may be stored in a computer-readable storage medium. Based on such an understanding, the technical solution of the embodiments of the present disclosure, in essence, or the part that contributes to the related art, may be embodied in the form of a software product, which is stored in the storage medium and includes several instructions for causing a computing device (which may be a personal computer, server, or network device, etc.) to perform all or part of the methods described in the various embodiments of the present disclosure. The foregoing storage medium includes a USB flash drive, a removable hard disk, a read only memory (ROM), a magnetic disk, an optical disk, or any other medium that can store program code.

The above description is merely the embodiment of the present disclosure, but the protection scope of the present disclosure is not limited thereto. Any change or replacement readily contemplated by a person skilled in the art within the technical scope disclosed herein shall fall within the protection scope of the present disclosure. Therefore, the scope of protection of the present disclosure shall prevail over the scope of protection of the claims.

The invention claimed is:

1. A method for power control, comprising:
when a cumulative power control mode is enabled, determining a physical uplink shared channel (PUSCH) transmission occasion (i–r) as a reference point corresponding to a closed-loop power control parameter of a PUSCH transmission occasion i according to following two conditions: 1) transmission of physical layer downlink control information for scheduling the PUSCH transmission occasion (i–r) is no later than that of physical layer downlink control information for scheduling the PUSCH transmission occasion i; and 2) r takes a minimum positive integer which satisfies the condition 1);
determining, according to the reference point, a power adjustment value corresponding to the closed-loop power control parameter of the PUSCH transmission occasion i;
determining, according to the reference point and the power adjustment value, the closed-loop power control parameter of the PUSCH transmission occasion i; and
determining, according to the closed-loop power control parameter of the PUSCH transmission occasion i, a transmission power of uplink data to be transmitted within the PUSCH transmission occasion i.

2. The method of claim 1, wherein determining, according to the reference point, the power adjustment value corresponding to the closed-loop power control parameter of the PUSCH transmission occasion i comprises:
determining a cumulative sum of power adjustment values indicated by transmit power control (TPC) commands included in all physical layer downlink control information between the physical layer downlink control information for scheduling the PUSCH transmission occasion (i–r) and the physical layer downlink control information for scheduling the PUSCH transmission occasion i as the power adjustment value corresponding to the closed-loop power control parameter of the PUSCH transmission occasion i, wherein all the physical layer downlink control information comprises the physical layer downlink control information for scheduling the PUSCH transmission occasion i but does not comprise the physical layer downlink control information for scheduling the PUSCH transmission occasion (i–r).

3. The method of claim 1, wherein determining, according to the reference point, the power adjustment value corresponding to the closed-loop power control parameter of the PUSCH transmission occasion i comprises:
determining all physical layer downlink control information between the physical layer downlink control information for scheduling the PUSCH transmission occasion (i–r) and the physical layer downlink control information for scheduling the PUSCH transmission occasion i as a first physical layer downlink control information set; removing the physical layer downlink control information for scheduling the PUSCH transmission occasion (i–r) from the first physical layer downlink control information set, to obtain a second physical layer downlink control information set;
accumulating power adjustment values indicated by transmit power control (TPC) commands included in all physical layer downlink control information in the second physical layer downlink control information set, to obtain a first accumulated sum; and
determining the first accumulated sum as the power adjustment value corresponding to the closed-loop power control parameter of the PUSCH transmission occasion i.

4. The method of claim 1, wherein when r=1, determining the reference point corresponding to the closed-loop power control parameter of the PUSCH transmission occasion i comprises: determining a PUSCH transmission occasion (i–1) as the reference point corresponding to the closed-loop power control parameter of the PUSCH transmission occasion i; correspondingly, determining, according to the reference point, the power adjustment value corresponding to the closed-loop power control parameter of the PUSCH transmission occasion i comprises: accumulating power adjustment values indicated by transmit power control (TPC) commands included in all physical layer downlink control information between the PUSCH transmission occasion (i–1) and the PUSCH transmission occasion i, to obtain a second accumulated sum; and
determining the second accumulated sum as the power adjustment value corresponding to the closed-loop power control parameter of the PUSCH transmission occasion i.

5. The method of claim 1, further comprising:
receiving higher layer signaling from a base station, wherein the higher layer signaling comprises a plurality of open-loop power control parameter sets;
selecting, according to selection information of an open-loop power control parameter, one open-loop power control parameter set from the plurality of open-loop power control parameters sets; and
correspondingly, determining, according to the closed-loop power control parameter of the PUSCH transmission occasion i, the transmission power of the uplink data to be transmitted within the PUSCH transmission occasion i comprises: determining, according to the closed-loop power control parameter of the PUSCH transmission occasion i and the open-loop power control parameter set, the transmission power of the uplink data to be transmitted within the PUSCH transmission occasion i.

6. The method of claim 5, wherein the selection information of the open-loop power control parameter comprises one of: a logical channel group, a radio network temporary identifier (RNTI) group for scrambling physical layer downlink control information for scheduling data to be transmitted, or first indication information in physical layer downlink control information for scheduling data to be transmitted;

wherein one open-loop power control parameter set has a mapping with at least one piece of the selection information of the open-loop power control parameter.

7. The method of claim 5, wherein when a cumulative power control mode is enabled, determining the reference point corresponding to the closed-loop power control parameter of the PUSCH transmission occasion i comprises:
   determining the PUSCH transmission occasion (i−r) as the reference point according to following two conditions; 1) determining the PUSCH transmission occasion (i−r) according to one of following conditions:
      i) an open-loop power control parameter set selected for the PUSCH transmission occasion (i−r) and an open-loop power control parameter set selected for the PUSCH transmission occasion i are the same;
      ii) data transmitted within the PUSCH transmission occasion (i−r) and data transmitted within the PUSCH transmission occasion i belong to a same service type group or a same logical channel group;
      iii) a radio network temporary identifier (RNTI) for scrambling the physical layer downlink control information for scheduling the PUSCH transmission occasion (i−r) and a RNTI for scrambling the physical layer downlink control information for scheduling the PUSCH transmission occasion i belong to a same RNTI group; or
      iv) first indication information included in the physical layer downlink control information for scheduling the PUSCH transmission occasion (i−r) and first indication information included in the physical layer downlink control information for scheduling the PUSCH transmission occasion i are the same; and
   2) r takes a minimum positive integer which satisfies the condition 1).

8. The method of claim 5, wherein when the cumulative power control mode is enabled, determining the power adjustment value corresponding to the closed-loop power control parameter of the PUSCH transmission occasion i comprises:
   determining a power adjustment value indicated by a transmit power control (TPC) command included in physical layer downlink control information of the PUSCH transmission occasion i as the power adjustment value corresponding to the closed-loop power control parameter of the PUSCH transmission occasion i.

9. A terminal, comprising:
   a processor, and
   a memory storing computer instructions executable by the processor,
   wherein the processor is configured to, when executing the computer instructions, perform operations comprising:
      when a cumulative power control mode is enabled, determining a physical uplink shared channel (PUSCH) transmission occasion (i−r) as a reference point corresponding to a closed-loop power control parameter of a PUSCH transmission occasion i according to following two conditions: 1) transmission of physical layer downlink control information for scheduling the PUSCH transmission occasion (i−r) is no later than that of physical layer downlink control information for scheduling the PUSCH transmission occasion i; and 2) r takes a minimum positive integer which satisfies the condition 1);
      determining, according to the reference point, a power adjustment value corresponding to the closed-loop power control parameter of the PUSCH transmission occasion i;
      determining, according to the reference point and the power adjustment value, the closed-loop power control parameter of the PUSCH transmission occasion i; and
      determining, according to the closed-loop power control parameter of the PUSCH transmission occasion i, a transmission power of uplink data to be transmitted within the PUSCH transmission occasion i.

10. The terminal of claim 9, wherein the processor is specifically configured to perform operations comprising:
    determining a cumulative sum of power adjustment values indicated by transmit power control (TPC) commands included in all physical layer downlink control information between the physical layer downlink control information for scheduling the PUSCH transmission occasion (i−r) and the physical layer downlink control information for scheduling the PUSCH transmission occasion i as the power adjustment value corresponding to the closed-loop power control parameter of the PUSCH transmission occasion i, wherein all the physical layer downlink control information comprises the physical layer downlink control information for scheduling the PUSCH transmission occasion i but does not comprise the physical layer downlink control information for scheduling the PUSCH transmission occasion (i−r).

11. The terminal of claim 9, wherein the processor is specifically configured to perform operations comprising:
    determining all physical layer downlink control information between the physical layer downlink control information for scheduling the PUSCH transmission occasion (i−r) and the physical layer downlink control information for scheduling the PUSCH transmission occasion i as a first physical layer downlink control information set; removing the physical layer downlink control information for scheduling the PUSCH transmission occasion (i−r) from the first physical layer downlink control information set, to obtain a second physical layer downlink control information set;
    accumulating power adjustment values indicated by transmit power control (TPC) commands included in all physical layer downlink control information in the second physical layer downlink control information set, to obtain a first accumulated sum; and
    determining the first accumulated sum as the power adjustment value corresponding to the closed-loop power control parameter of the PUSCH transmission occasion i.

12. The terminal of claim 9, wherein when r=1, the processor is specifically configured to perform operations comprising:
    determining a PUSCH transmission occasion (i−1) as the reference point corresponding to the closed-loop power control parameter of the PUSCH transmission occasion i; and accumulating power adjustment values indicated by transmit power control (TPC) commands included in all physical layer downlink control information between the PUSCH transmission occasion (i−1) and the PUSCH transmission occasion i, to obtain a second accumulated sum; and
    determining the second accumulated sum as the power adjustment value corresponding to the closed-loop power control parameter of the PUSCH transmission occasion i.

13. The terminal of claim 9, wherein the terminal further comprises:
a communication interface, configured to receive higher layer signaling from a base station, the higher layer signaling comprising a plurality of open-loop power control parameter sets;
the processor is further configured to perform operation comprising:
selecting, according to selection information of an open-loop power control parameter, one open-loop power control parameter set from the plurality of open-loop power control parameters sets; and
determining, according to the closed-loop power control parameter of the PUSCH transmission occasion i and the open-loop power control parameter set, the transmission power of the uplink data to be transmitted within the PUSCH transmission occasion i.

14. The terminal of claim 13, wherein the selection information of the open-loop power control parameter comprises one of: a logical channel group, a radio network temporary identifier (RNTI) group for scrambling physical layer downlink control information for scheduling data to be transmitted, or first indication information in physical layer downlink control information for scheduling data to be transmitted;
wherein one open-loop power control parameter set has a mapping with at least one piece of the selection information of the open-loop power control parameter.

15. The terminal of claim 13, wherein when a cumulative power control mode is enabled, the processor is specifically configured to perform operations comprising:
determining the PUSCH transmission occasion (i−r) as the reference point according to following two conditions; 1) determining the PUSCH transmission occasion (i−r) according to one of following conditions:
i) an open-loop power control parameter set selected for the PUSCH transmission occasion (i−r) and an open-loop power control parameter set selected for the PUSCH transmission occasion i are the same;
ii) data transmitted within the PUSCH transmission occasion (i−r) and data transmitted within the PUSCH transmission occasion i belong to a same service type group or a same logical channel group;
iii) a radio network temporary identifier (RNTI) for scrambling the physical layer downlink control information for scheduling the PUSCH transmission occasion (i−r) and a RNTI for scrambling the physical layer downlink control information for scheduling the PUSCH transmission occasion i belong to a same RNTI group; or
iv) first indication information included in the physical layer downlink control information for scheduling the PUSCH transmission occasion (i−r) and first indication information included in the physical layer downlink control information for scheduling the PUSCH transmission occasion i are the same; and
2) r takes a minimum positive integer which satisfies the condition 1).

16. The terminal of claim 13, wherein when the cumulative power control mode is enabled, the processor is specifically configured to perform operations comprising:
determining a power adjustment value indicated by a transmit power control (TPC) command included in physical layer downlink control information of the PUSCH transmission occasion i as the power adjustment value corresponding to the closed-loop power control parameter of the PUSCH transmission occasion i.

17. A non-transitory computer-readable storage medium having stored therein computer instructions that, when executed by a processor, cause the processor to perform operations comprising:
when a cumulative power control mode is enabled, determining a physical uplink shared channel (PUSCH) transmission occasion (i−r) as a reference point corresponding to a closed-loop power control parameter of a PUSCH transmission occasion i according to following two conditions: 1) transmission of physical layer downlink control information for scheduling the PUSCH transmission occasion (i−r) is no later than that of physical layer downlink control information for scheduling the PUSCH transmission occasion i; and 2) r takes a minimum positive integer which satisfies the condition 1);
determining, according to the reference point, a power adjustment value corresponding to the closed-loop power control parameter of the PUSCH transmission occasion i;
determining, according to the reference point and the power adjustment value, the closed-loop power control parameter of the PUSCH transmission occasion i; and
determining, according to the closed-loop power control parameter of the PUSCH transmission occasion i, a transmission power of uplink data to be transmitted within the PUSCH transmission occasion i.

* * * * *